United States Patent [19]
Daley

[11] Patent Number: 5,885,622
[45] Date of Patent: Mar. 23, 1999

[54] METHOD AND APPARATUS FOR HEATING THERMOFORMABLE MATERIAL IN FOOTWEAR

[76] Inventor: Pete Daley, Box 881567, Steamboat Springs, Colo. 80438

[21] Appl. No.: 646,921

[22] Filed: May 8, 1996

[51] Int. Cl.⁶ .................................................. B29C 33/02
[52] U.S. Cl. ............................ 425/2; 12/129.4; 425/403; 264/DIG. 30
[58] Field of Search .............................. 12/129.4, 142 N, 12/146 M; 425/2, 384, 403, 469; 264/DIG. 30

[56] References Cited

U.S. PATENT DOCUMENTS

| | | | |
|---|---|---|---|
| 1,326,112 | 12/1919 | Stubbs | 12/129.4 |
| 1,760,104 | 5/1930 | Beckwith | 12/129.4 |
| 2,277,769 | 3/1942 | MacDonald | 12/129.4 |
| 3,154,392 | 10/1964 | Littman | 12/129.4 |
| 3,481,820 | 12/1969 | Jonas . | |
| 3,632,963 | 1/1972 | Bosse . | |
| 3,641,688 | 2/1972 | Von den Benken . | |
| 3,848,287 | 11/1974 | Simonsen . | |
| 3,895,405 | 7/1975 | Edwards . | |
| 4,006,542 | 2/1977 | Larson . | |
| 4,198,765 | 4/1980 | Miyamae . | |
| 4,669,142 | 6/1987 | Meyer . | |
| 4,964,229 | 10/1990 | Laberge . | |
| 4,979,252 | 12/1990 | Daley | 425/2 |
| 5,383,290 | 1/1995 | Grim . | |

FOREIGN PATENT DOCUMENTS

| | | | |
|---|---|---|---|
| 282222 | 12/1927 | United Kingdom | 12/129.4 |

*Primary Examiner*—James P. Mackey
*Attorney, Agent, or Firm*—Hoffman, Wasson & Gitler

[57] ABSTRACT

The invention utilizes forced air heating in which heated air is fed through tubes to a mold or form shaped substantially like a human foot. The mold or form has apertures or holes which are patterned to provide heat to the insole and/or tongue, heel, counter, midfoot, arch, and toe box. The size of the holes can vary in size as can the quantity depending upon how much heat is needed by a specific area. Panels may be provided in the mold or form to regulate the amount of air flow to a given area. Where insoles are the main item being formed, the insole must be beveled before it is molded because the material has a tendency to expand to its original thickness upon heating. Beveling the edges of the insole before it is premolded prevents the insole from expanding around the edges when the insole is molded to a person's foot.

11 Claims, 10 Drawing Sheets

METHOD AND APPARATUS FOR HEATING THERMOFORMABLE MATERIAL IN FOOTWEAR

BACKGROUND OF THE INVENTION

1. Field of the Invention

The present invention pertains to a method and apparatus for heating thermoformable material in footwear such as an insole. More particularly, the present invention relates to a device for insertion into a piece of footwear where the thermoformable material is heated by the application of hot air, and the wearer's foot is inserted to form the heated insole at the contour of the foot. The device includes a form or mold which fits into the footwear and has apertures for directing the flow of hot air.

2. Description of the Prior Art

Various systems for producing custom insoles have been developed. For example, U.S. Pat. No. 3,895,405 to Edwards teaches an adjustable insole method in which an insole having a cushion layer and a foam cover is inserted into a shoe. A heat gun then applies heat to the insole. The wearer then places his or her foot into the shoe so that the insole conforms to the wearer's foot. The Edwards system has several limitations. First, the heat gun cannot evenly heat the entire insole. Second, there is no way to ensure that the end of the insole away from the opening will receive sufficient heating. Third, the Edwards patent does not disclose any way to heat any other portion of the inside of the shoe to create a custom inner surface.

Other systems for producing insoles are complicated and require considerable time to complete, as well as involve significant cost. U.S. Pat. No. 4,669,142 to Meyer shows such a method in which a cast is made of the wearer's foot, an insole is inserted into the cast where it is heated. The wearer then places his or her foot upon the insole in the cast so that it conforms to the foot. In addition to the foregoing drawbacks, the Meyer method does not allow for heating and conforming of other portions of the inside of the shoe or for insoles which extend along the sides and top of the foot. Similarly, since the insole is not heated inside the shoe, conformity of the insole to the inside of the shoe in addition to the shape of the wearer's foot, cannot be guaranteed.

SUMMARY OF THE INVENTION

The foregoing and other deficiencies of the prior art are addressed by the present invention which is directed to a method and apparatus for heating an insole and thermoformable material for footwear. The method and apparatus provide a simple, quick and inexpensive way to personalize the insole or plantar surface, as well as tongue, heel, counter, midfoot, arch, and toe box of a pair of footwear. The footwear can include, but is not limited to, shoes, ice skates, roller skates, in-line skates, ski-boots, and running shoes.

The invention utilizes forced air heating in which heated air is fed through tubes to a mold or form shaped substantially like a human foot. The mold or form has apertures or holes which are patterned to provide heat to the insole and/or tongue, heel, counter, midfoot, arch, and toe box. The size of the holes can vary in size as can the quantity depending upon how much heat is needed by a specific area. Panels may be provided in the mold or form to regulate the amount of air flow to a given area.

Where insoles are the main item being formed, the insole must be beveled before it is molded because the material has a tendency to expand to its original thickness upon heating. Beveling the edges of the insole before it is premolded prevents the insole from expanding around the edges when the insole is molded to a person's foot.

From the foregoing, it is an object of the present invention to provide a method and apparatus for heating thermoformable material in footwear to customize the footwear to the wearer's feet.

Another object of the present invention is to provide a method and apparatus for customizing footwear quickly and economically.

Yet another object is to provide a method and apparatus for customizing the interior of footwear by inserting a form into the footwear and applying heat through the form.

Another object is to provide a method and apparatus in which a form is provided and has holes therein for controlling the focus of heat to the interior of the footwear.

Still another object of the present invention is to provide a method and apparatus for heating the interior of footwear in a customizing process, where a form inserted into the footwear has holes, in size and patterned to provide desired amounts of heat to various ideas of the interior.

BRIEF DESCRIPTION OF THE DRAWINGS

The foregoing and other objects and attributes of the present invention will be described with respect to the following drawings in which.

DETAILED DESCRIPTION OF THE PREFERRED EMBODIMENT

Referring to FIGS. 1–4, a first embodiment of a mold according to the present invention is illustrated. The mold or form 20 is shaped like a shoe last or a human foot. It is contemplated that a variety of sizes of molds 20 would be available to accommodate a large range of sizes of footwear.

Figure 3:
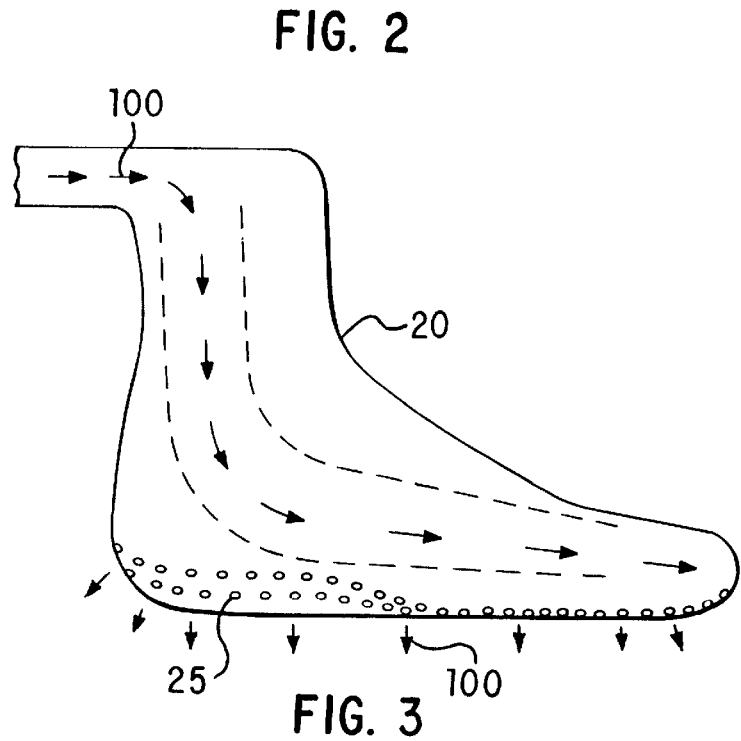
FIG. 3 is a cross-sectional view of the form shown in FIG. 1 with air flow shown by arrows.
Figure 6:
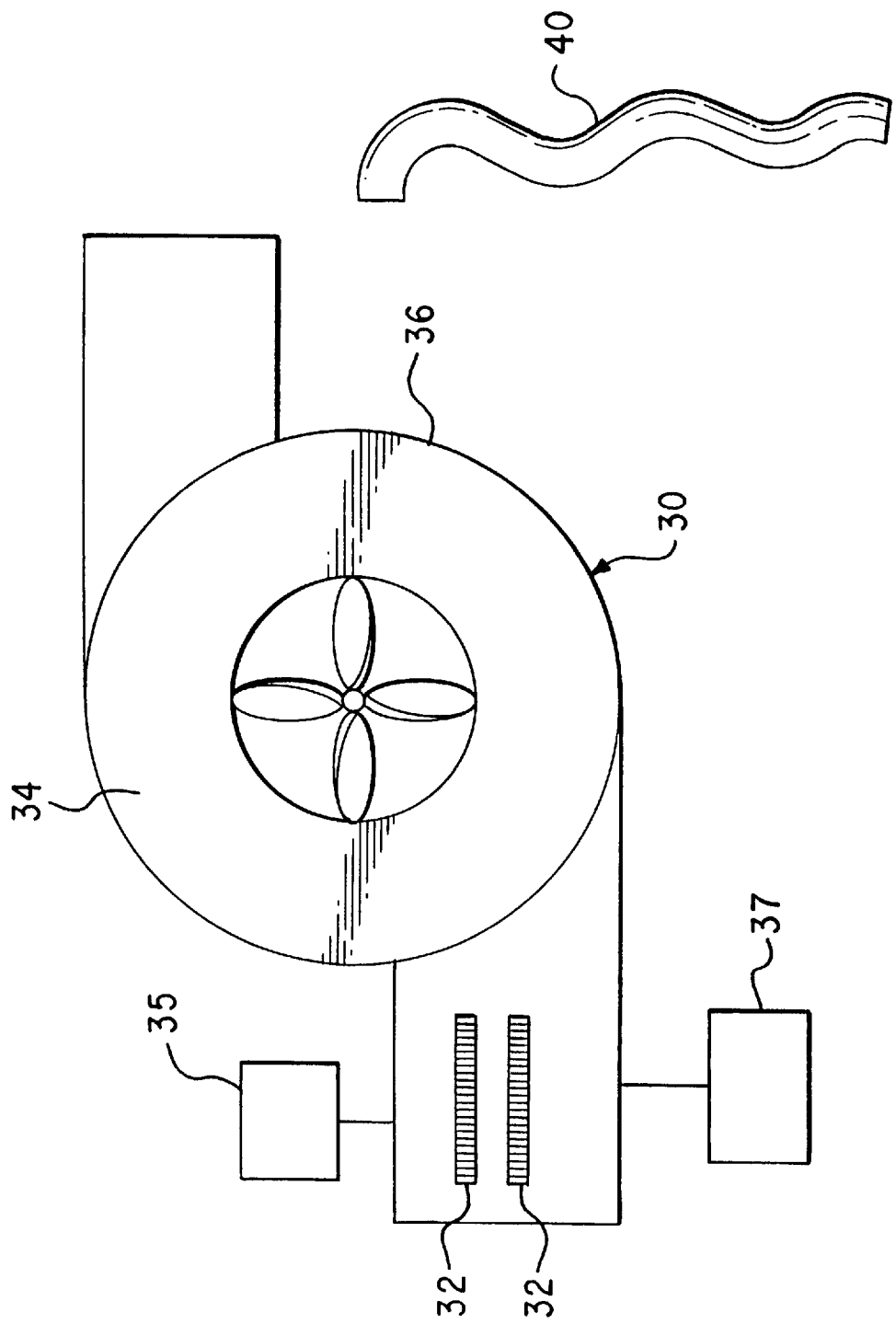
FIG. 6 is a cross-sectional view of a heat source according to the present invention.

The mold 20 has a series of apertures or vents 25 in various parts of the mold. The arrangement, size, and quantity of vents 25 depends upon what part of the footwear is to be customized and the properties of the thermoformable material to be molded. A heat source 30, shown in FIG. 6, is connected by tubes 40 to the mold 20 to supply heated air to the footwear through the vents 25 as shown in FIG. 3. The heat source 30 has one or more heating elements 32 and a blower 34 to generate and move the heated air, respectively. Further details of the heat source 30 will be detailed later.

The mold 20 shown in FIGS. 1–4 is intended to be used to customize an insole, made with thermoformable material, inserted into the footwear prior to heating. The insole 60 is shown in FIGS. 8–17. As illustrated by arrows 100 in FIG. 3, air flows into the mold 20 and circulates throughout the interior of the mold 20. The heated air escapes through apertures 25 to heat the insole 60. The location, number and size of the apertures 25 is selected to heat the insole 60 based upon the location of the thermoformable material, the degree of heating required, the areas to be customized, and the type of insole inserted in the footwear.

Figure 4:
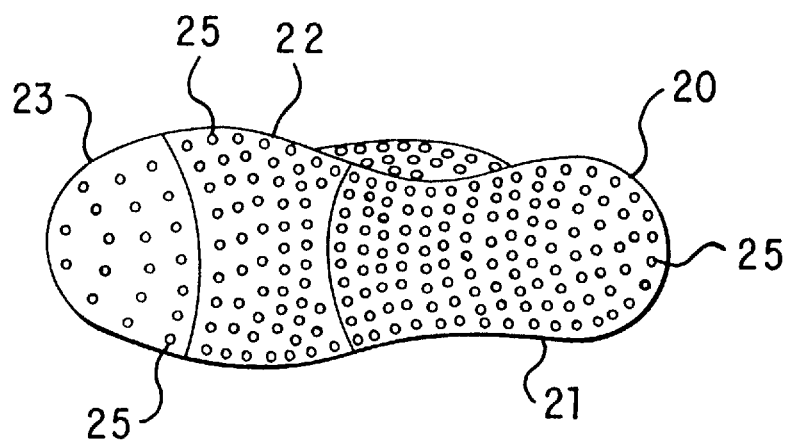
FIG. 4 is a bottom view of the form for a planter inside form.

The bottom view of the mold 20 shown in FIG. 4, has three distinct panels. The heel panel 21 has large diameter apertures 25, and a very large quantity of apertures. The midfoot panel 22 has mid-size apertures 25 and the apertures are less densely distributed. The forefoot panel 23 has relatively small diameter holes 25, and they are sparsely spread across the forefoot section. Such a mold 20 is intended to supply more heat to the heel, less heat to the midfoot and the least heat to the forefoot of the underlying insole. It is expected that the insole used with such a mold 25 would require more customizing in the heel region than the midfoot or forefoot regions. The forefoot has fewer vents and/or vents with smaller diameter the air flow. The air flow is limited so that the forefoot will not mold too deep. On the other hand, considerably more heat is sent to the rear foot area to deep mold the arch and heel areas.

Figure 5:
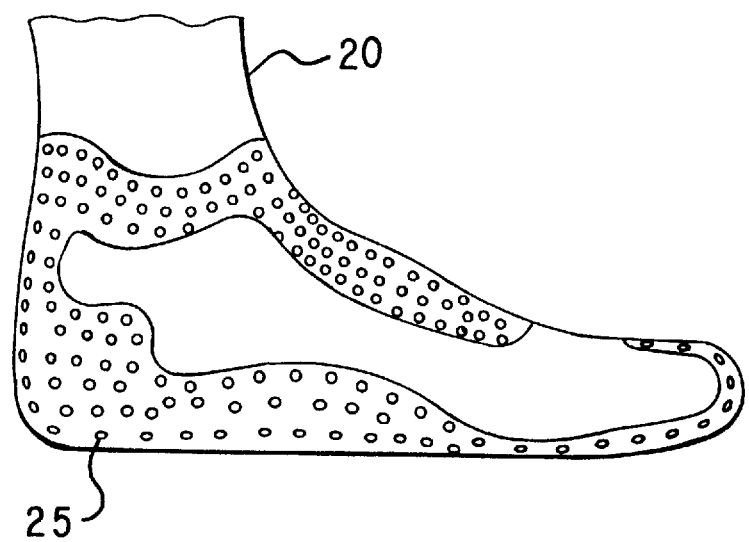
FIG. 5 is a side view of a form according to a second embodiment of the present invention for a full foot and shoe.

FIG. 5 is a side view of a mold 20 of a second embodiment of the present invention. In the embodiment shown in FIG. 4, the mold 20 has apertures 25 extending over additional surfaces, not just the undersurface. There are apertures 25 extending up the heel of the mold to the back of the foot and around the ankle area. There are also apertures in the tongue region, over the forefoot and along the arch of the mold 20. Such a mold 20 is intended for use in footwear having thermoformable material in areas corresponding to the apertures 25.

The heat source 30 is shown in FIG. 6 and includes heating elements 32 and a blower 34 contained in a housing 36. The heat source 30 may have one or more heating elements 32. In addition, a temperature regulator 35 and a timer 37 may be included. The temperature and/or the duration of the heating operation can be varied depending upon the type of insole and/or footwear being customized. The tube or lines 35 interconnecting the heat source 30 and the mold 20 are made from materials which are resistant to deformation due to the flow of heated air. An isolator or insulation material may also be included to deflect heat from the wall of the mold to eliminate overheating.

The temperature regulator 35 and a timer 37 provide the ability to regulate the heating of the thermoformable material. The time can be limited to prevent damage from overheating and would be controlled based upon the materials being used. The heat source could have preset settings for certain materials. For example, cross-linked polyethylene requires more heat than ethylene vinyl acetate. The temperature can be limited in a similar manner depending upon the materials used. Lighter density materials require less heat and higher density materials require more heat.

Figure 7A:
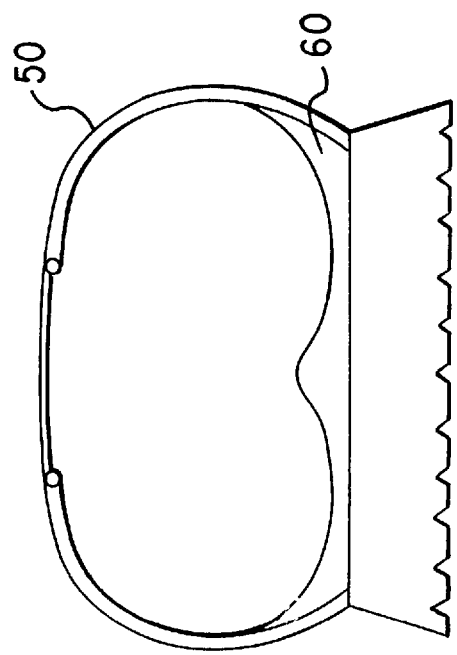
FIGS. 7A and 7B are cross-sectional views of footwear having insoles according to the present invention.
Figure 7B:
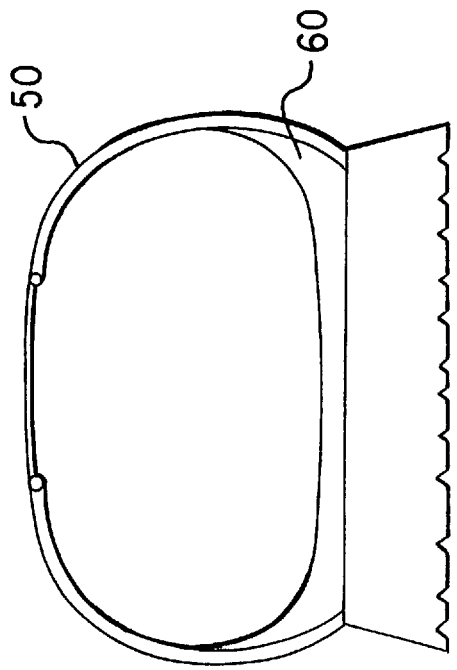

Referring to FIGS. 7A and 7B, cross-sectional views of footwear having insoles according to the present invention are shown. FIG. 7A shows a shoe 50 having a premolded insole 60 which has not been customized. The insole is fully functional even if it has not been customized. After heating, the insole will have the cross-section shown in FIG. 7B with the upper surface of the insole 60 conforming to the bottom of a wearer's foot.

FIGS. 8–17 illustrate various insoles according to the present invention and discussed hereafter. The insole 60 can have a deep heel cup, high wrapping arch and a forefoot area. The insole 60 can have different density layers or a single layer of thermoformable material such as ethylene vinyl acetate, polyethylene vinyl acetate, cross-linked polyethylene or a combination of such materials. The insole 60 can be multiple with some layers not being thermoformable, but which will take the shape of the molded layer or layers surrounding the non-thermoformable material. Other materials can be used as the thermoformable material as long as such materials are thermoformable.

Figure 8A:
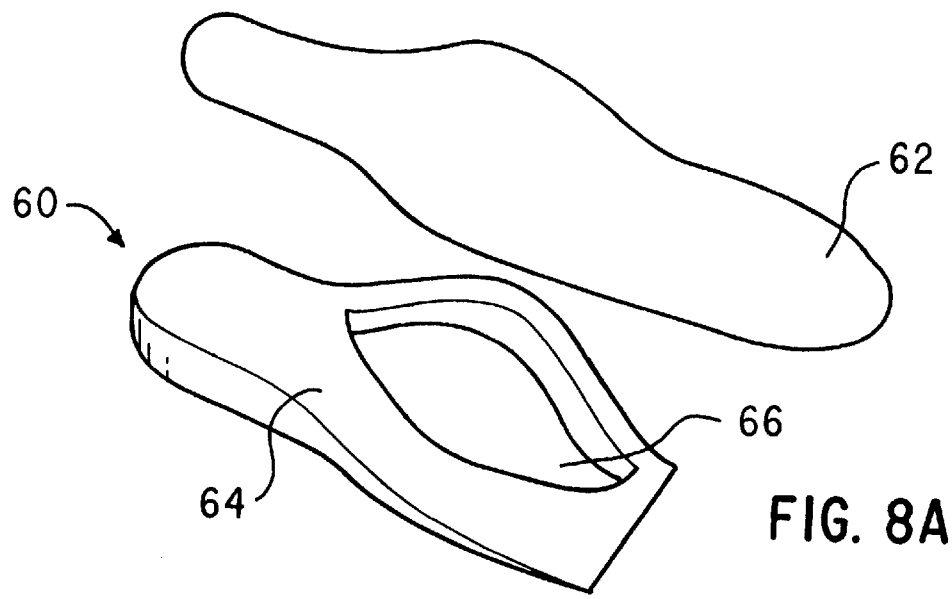
FIGS. 8A–8C are perspective views of an insole with cutaways according to the present invention.
Figure 8B:
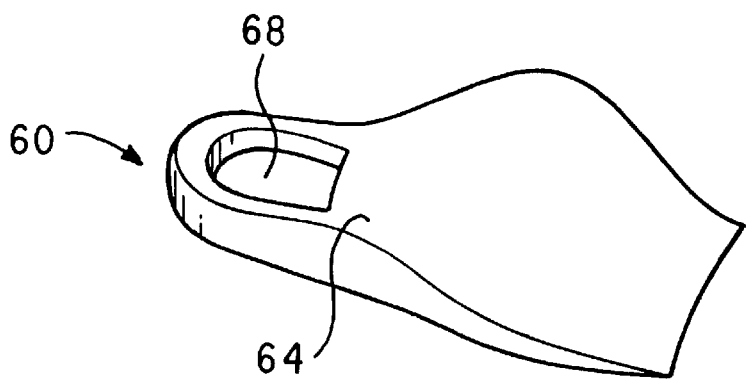
Figure 8C:
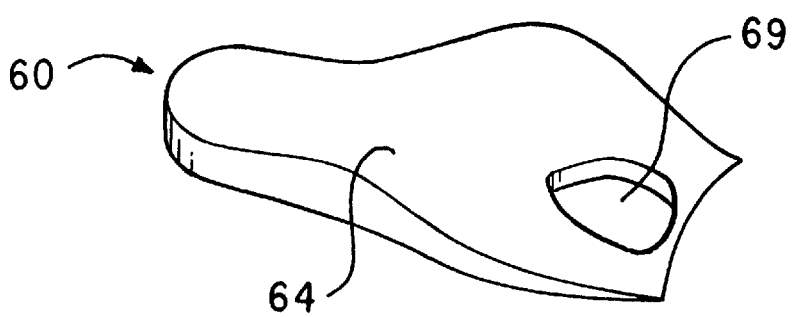

The insole 60 may also have zones of softer, more moldable material and firmer material for support. For example, FIG. 8A shows an insole 60 having top inlay 62 of non-thermoformable material, and a ¾ heel 64 of thermoformable material. The heel cup 64 has an arch cavity 66 for accommodating shock dampening component. FIG. 8B shows a ¾ heel cup 64 similar to the one shown in FIG. 8A, but having a heel cavity 68. A ¾ heel cup is shown in FIG. 8C, and it has a metatarsal arch cavity 69. The firm top layer 62 distributes the pressure over a wider area making the bottom layer 64 stronger and more resistant to packing out. The top layer 62 also allows the bottom layers 64 the ability to compress and rebound.

Figure 9:
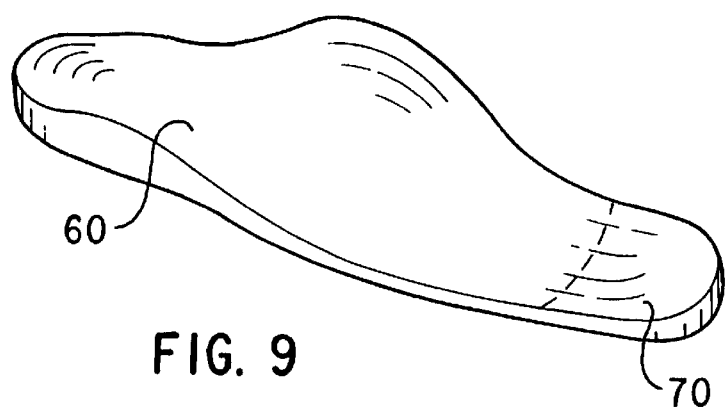
FIG. 9 is a perspective view of an insole according to the present invention having a thickness forefoot area.

The insole 60 may have a thicker forefoot area 70, as shown in FIG. 9, for enhanced molding. The forefoot area 70 may be either part of a unitary insole 60 or a separate element.

Figure 10A:
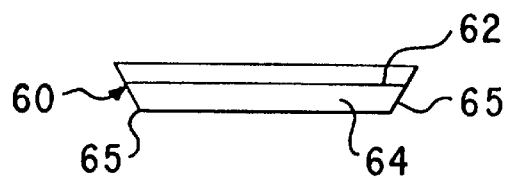
FIGS. 10A–10D are cross-sectional views of insoles according to the present invention.
Figure 10B:
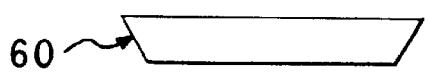
Figure 10C:
Figure 10D:

Regardless of what type of insole is used, it must be beveled on its edge before it is premolded to prevent it from expanding to its original thickness after heating. FIGS. 10A–10D show cross-sections of beveled insoles. In FIG. 10A, the insole 60 has a firm top layer 62 and a soft bottom layer 64. The sides 65 of the insole 60 are beveled so that they taper from top to bottom. FIGS. 10B–10D show the insole 60 at different steps of the method of the present invention. In FIG. 10B the beveled insole has not been inserted or heated. FIG. 10C shows the insole 60 after heating in a shoe. FIG. 10D shows the insole 60 after insertion of a wearer's foot to customize the insole 60.

Figure 11:
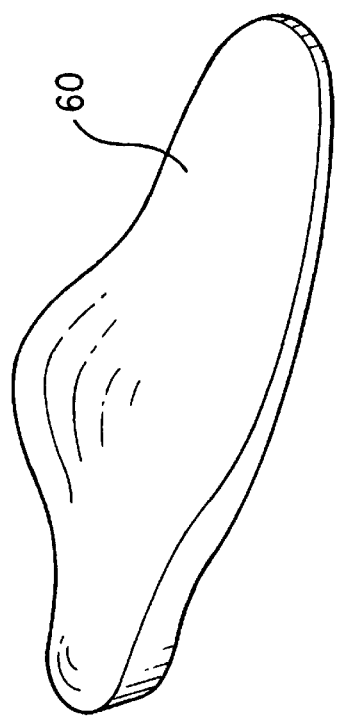
FIG. 11 is a perspective view of a beveled insole according to the present invention.
Figure 12:
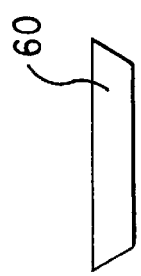
FIG. 12 is a cross-sectional view of a beveled insole shown in FIG. 11.

FIG. 11 shows a one piece beveled insole 60 according to the present invention and FIG. 12 is the cross-sectional view thereof.

Figure 13:
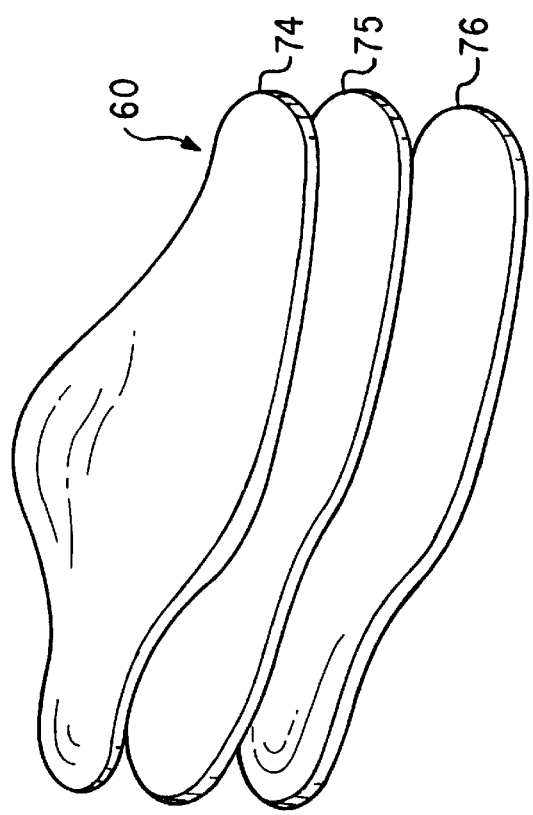
FIG. 13 is a perspective view of a three layer insole according to the present invention.

The multiple layer embodiment of an insole 60 having a non-thermoformable layer is shown in FIG. 13, where a non-thermoformable layer 75 is surrounded by thermoformable layers 74 and 76, above and below it. The layers 74 and 76 which will conform to the wearer's foot will also take the shape of the foot due to the reshaping of layers 74 and 76.

Figure 14A:
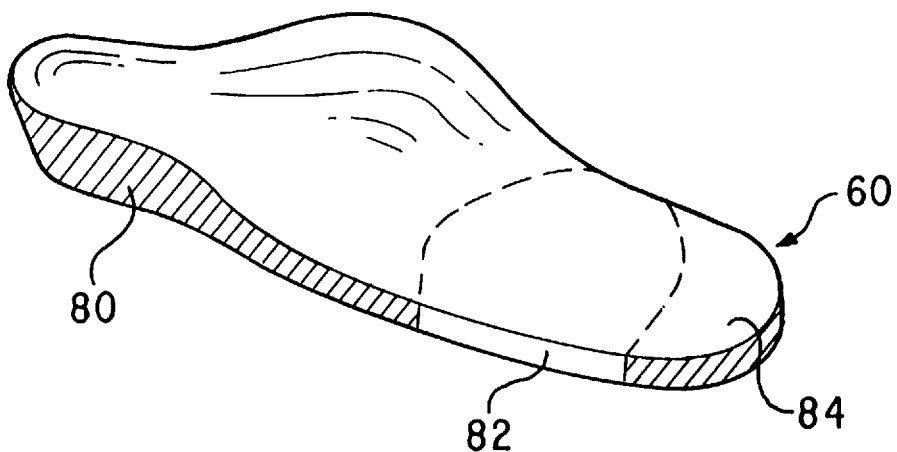
FIGS. 14A and 14B are perspective views of insoles according to the present invention.
Figure 14B:
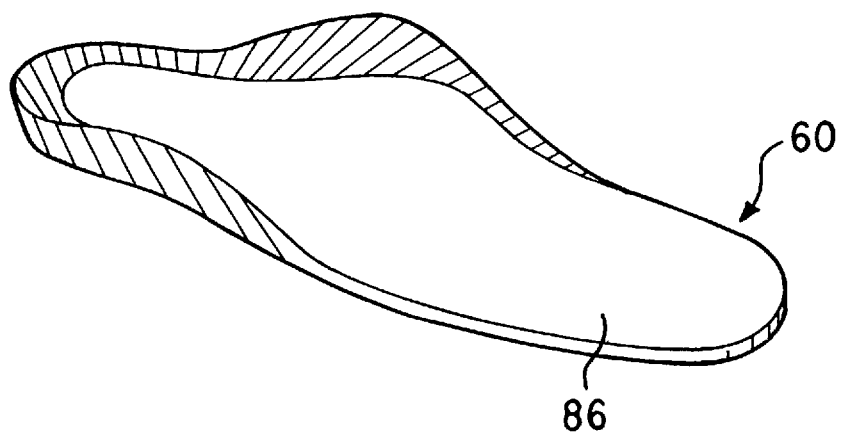

FIG. 14A shows an insole 60 having a firm rear foot section 80, a soft midfoot section 82 and a medium forefoot section 84. The degree to which these sections are heated is controlled by the selecting of a mold 20 and adjustments to the heat source 30. Similarly, FIG. 14B shows a ¾ heel cup insole 60 having a softer plantar surface 86.

Figure 15:
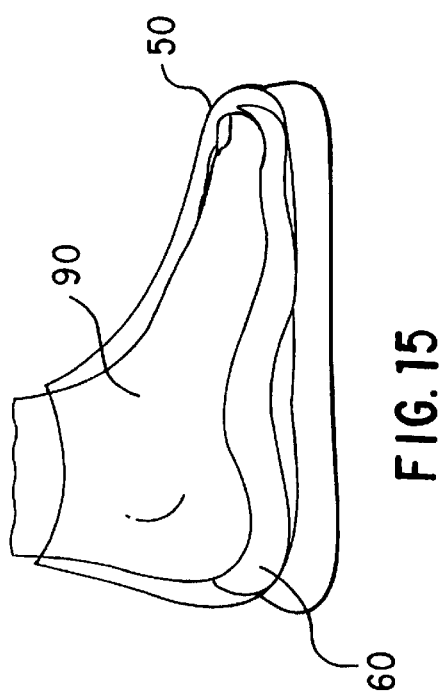
FIG. 15 is a side view of a foot in a cutaway view of a shoe and insole according to the present invention.

Referring to FIG. 15, the final step of the method of the present invention is illustrated. Here the insole 60 has been previously heated by the insertion of the mold 20 into the shoe 50. The wearer's foot 90 is inserted int he shoe 50 upon removal of the mold 20, and upon cooling of the insole 60 conform to the foot 90 of the wearer.

Figure 16:
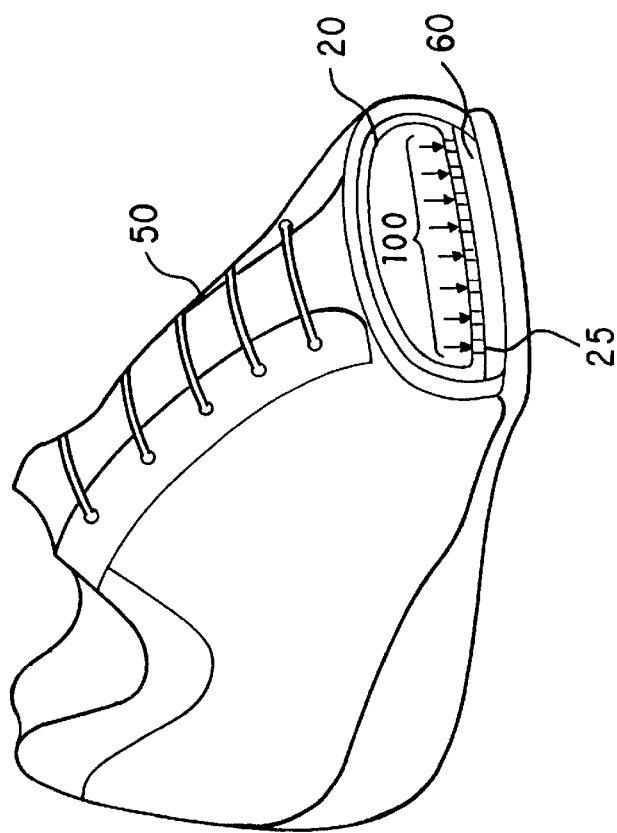
FIG. 16 is a partially cutaway perspective view of a shoe, heating mold and insole according to the present invention.
Figure 17:
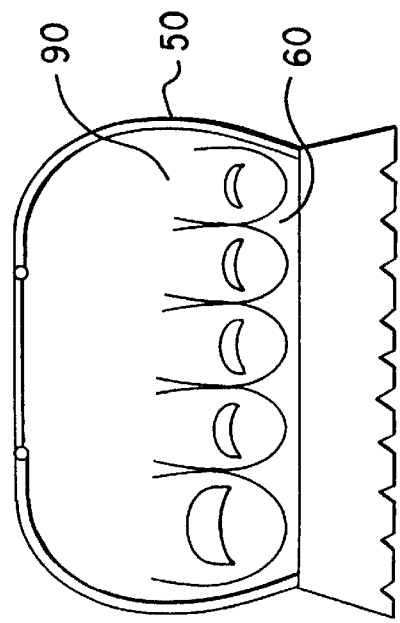
FIG. 17 is a cross-sectional view of a shoe and foot with a heated insole according to the present invention.

FIG. 17 also shows the foot 90 in the shoe 50 during the customizing step. It can be clearly seen that the heat insole 60 conforms to the bottom of the wearer's foot 90 and the inside of the shoe 50. FIG. 16 illustrates the previous step of heating the insole 60 with the mold 20. The arrows 100 show the direction of air flow through the apertures 25.

The mold 20 may have panels to help regulate the flow of air through a given area. The panels may be removeable and changeable. For example, the mold 20 shown in FIG. 4 has three panels 23, the forefoot panel has the fewest and smallest holes 25. The rearfoot panel 21 has the most and largest holes 25 and the midfoot panel 22 has an intermediate number and size of holes 25.

Figure 1:
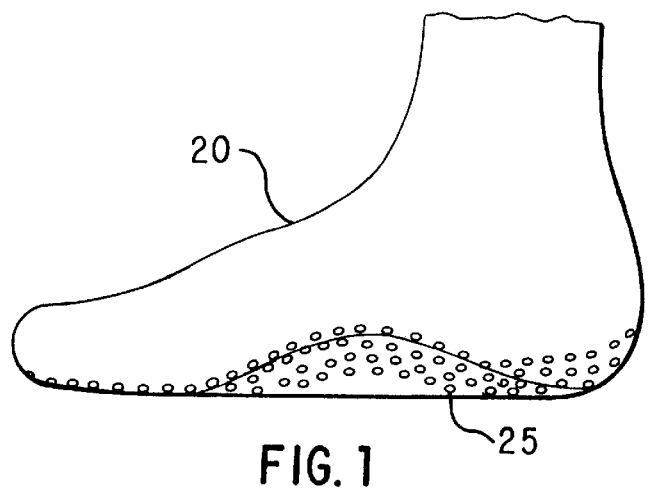
FIG. 1 is a side view of a form according to the present invention.
Figure 2:
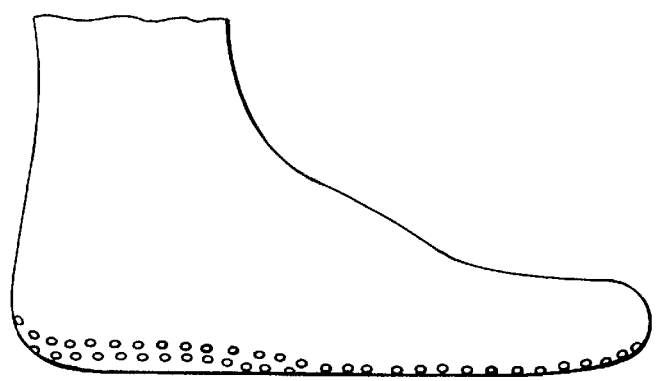
FIG. 2 is a cross-sectional view of the form shown in FIG. 1.
Figure 18:
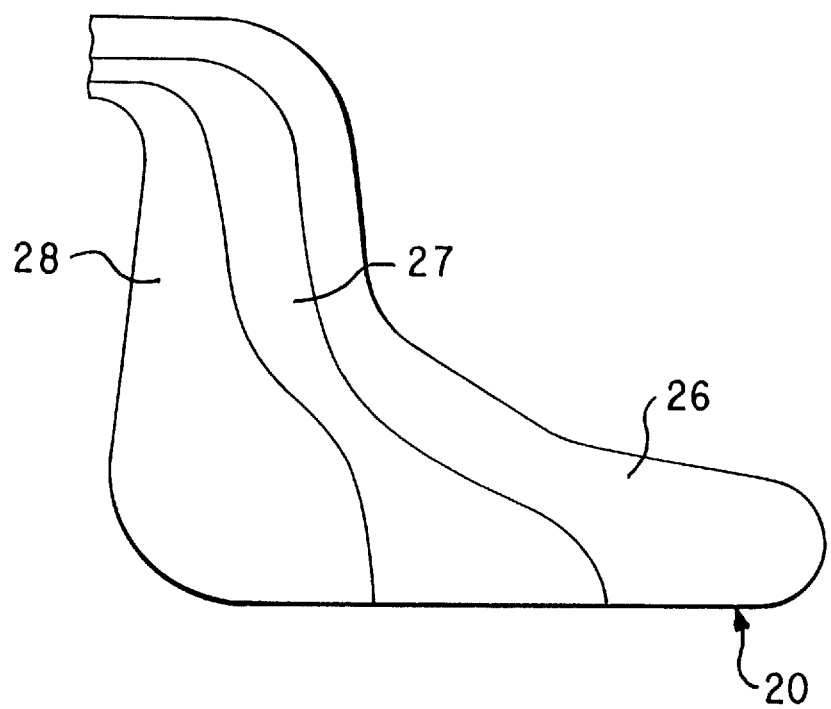
FIG. 18 is a cross-sectional view of another embodiment of the form of the present invention.

FIG. 18 shows a form 20 similar to the form 20 shown in FIG. 2, but differing by the inclusion of internal channels 26, 27 and 28. The channels 26, 27 and 28 act to create three separate heated air streams. The number of channels can be changed depending upon the heating needs of the insole and footwear. Channel 26 supplies a heated air stream to the forefoot. Channel 27 supplies a heated airstream to the midfoot, and channel 28 supplies a heated air stream to the rearfoot. Channels of the type shown herein help focus the delivery of heated air and ensure even circulation.

The present invention provides an apparatus and method for easily customizing footwear. The insole tongue, heel counter, midfoot, arch and toe box may all be customized. The invention can be used in a variety of circumstances, from mass merchant distribution to specialty store. It can require varying levels of expertise and footwear knowledge to operate depending upon the complexing of the apparatus.

Having described the preferred embodiments of the present invention, it is believed that other modifications, variations and changes will be suggested to those skilled in the art in view of the description set forth above, such as using it for shoes, skates, skiing boots, hiking boots and all types of footwear. It is therefore to be understood that all such variations, modifications and changes are believed to fall within the size of the present invention as defined in the appended claims.

What is claimed is:

1. A device for heating thermoformable material in footwear comprising:
    a heat source;
    at least one mold for insertion in said footwear; and
    means connecting said heat source to said mold;
        said mold having multiple apertures to direct said heat to said thermoformable materials;
        wherein said at least one mold further comprises a plurality of internal channels each disposed between said heat source and groups of said apertures to control delivery of heat to said thermoformable material,
        said plurality of internal channels each separately extending from said heat source to separate ones of said groups of said apertures.

2. A device as recited in claim 1, wherein said heat source produces hot air.

3. A device as recited in claim 1, wherein said at least one mold is shaped as a shoe last or a human foot.

4. A device as recited in claim 1, wherein said connecting means is a hose extending between said heat source and said at least one mold, said hose being resistant to heat deformation.

5. A device as recited in claim 1, wherein said heat source produces heat in a direction of at least one of an insole, and a tongue, an arch, a forefoot, a heal counter, and a midfoot formed from said thermoformable material.

6. A device as recited in claim 2, wherein said heat source is a blower or a fan.

7. A device as recited in claim 1, wherein said heat source further comprises a timer for controlling duration of application of heat to said thermoformable material.

8. A device as recited in claim 1, wherein said heat source further comprises a temperature regulator to control temperature of heat applied to said thermoformable material.

9. A device as recited in claim 1, wherein size, quantity and location of said apertures of said molds are provided to control what degree of heat is applied and to focus heat to particular locations of said footwear.

10. A device as recited in claim 2, wherein said at least one mold further comprises panels to control an amount of air flow to a given area of said footwear.

11. A device as recited in claim 1, wherein said plurality of internal channels comprise a forefoot channel, a midfoot channel, and a rearfoot channel.

* * * * *